United States Patent
Du et al.

(10) Patent No.: US 12,451,485 B2
(45) Date of Patent: Oct. 21, 2025

(54) PRESSURE-RESISTANT POSITIVE ACTIVE MATERIAL AND ELECTROCHEMICAL ENERGY STORAGE APPARATUS

(71) Applicant: CONTEMPORARY AMPEREX TECHNOLOGY (HONG KONG) LIMITED, Hong Kong (CN)

(72) Inventors: Rui Du, Ningde (CN); Yongchao Liu, Ningde (CN); Deyu Zhao, Ningde (CN); Sihui Wang, Ningde (CN); Chongheng Shen, Ningde (CN); Na Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 17/416,122

(22) PCT Filed: Nov. 25, 2019

(86) PCT No.: PCT/CN2019/120511
§ 371 (c)(1),
(2) Date: Jun. 18, 2021

(87) PCT Pub. No.: WO2020/134774
PCT Pub. Date: Jul. 2, 2020

(65) Prior Publication Data
US 2022/0045324 A1    Feb. 10, 2022

(51) Int. Cl.
*H01M 4/131* (2010.01)
*H01M 4/36* (2006.01)
(Continued)

(52) U.S. Cl.
CPC ........... *H01M 4/525* (2013.01); *H01M 4/131* (2013.01); *H01M 4/366* (2013.01);
(Continued)

(58) Field of Classification Search
CPC ...... H01M 4/525; H01M 4/131; H01M 4/366; H01M 10/0525; H01M 2004/021; H01M 2004/028
See application file for complete search history.

(56) References Cited

U.S. PATENT DOCUMENTS

| 2007/0248883 | A1* | 10/2007 | Oda ................... H01M 4/525 |
| | | | 429/231.1 |
| 2012/0043500 | A1* | 2/2012 | Xiang ................. C01G 51/50 |
| | | | 252/182.1 |

(Continued)

FOREIGN PATENT DOCUMENTS

| CN | 103930374 A | 7/2014 |
| CN | 108780889 A | 11/2018 |

(Continued)

OTHER PUBLICATIONS

International Search Report for International Application PCT/CN2019/120511.
(Continued)

*Primary Examiner* — Cynthia K Walls
(74) *Attorney, Agent, or Firm* — K&L Gates LLP

(57) ABSTRACT

This application relates to the field of battery technologies, and in particular, to a pressure-resistant positive active material and an electrochemical energy storage apparatus. The positive active material includes secondary particles composed of primary particles, and a quantity σ of primary particles per unit sphere area in a SEM graph of the secondary particles is 5/μm2 to 30/μm2. A single-particle pressure-resistant strength of the secondary particles is 60 MPa to 300 MPa. A molecular formula of the positive active material is LixNiyCozMkMepOrAm, where $0.95 \leq x \leq 1.05$, $0 \leq y \leq 1$, $\leq z \leq 1$, $0 \leq k \leq 1$, $0 \leq p \leq 0.1$, $1 \leq r \leq 2$, $0 \leq m \leq 2$, and $m+r \leq 2$. The positive active material in this application has a com-
(Continued)

pact particle structure and a high single-particle pressure-resistant strength.

13 Claims, 2 Drawing Sheets

(51) Int. Cl.
  *H01M 4/525* (2010.01)
  *H01M 10/0525* (2010.01)
  *H01M 4/02* (2006.01)
(52) U.S. Cl.
  CPC .. *H01M 10/0525* (2013.01); *H01M 2004/021* (2013.01); *H01M 2004/028* (2013.01)

(56) References Cited

U.S. PATENT DOCUMENTS

| | | | | |
|---|---|---|---|---|
| 2012/0231322 A1* | 9/2012 | Chu | ...................... | H01M 4/485 |
| | | | | 429/207 |
| 2015/0228973 A1* | 8/2015 | Won | ...................... | H01M 4/525 |
| | | | | 429/223 |
| 2016/0118656 A1* | 4/2016 | Nakayama | ............ | H01M 4/525 |
| | | | | 252/182.1 |
| 2016/0149215 A1* | 5/2016 | Shim | ...................... | C01G 51/42 |
| | | | | 429/231.1 |
| 2016/0181611 A1* | 6/2016 | Cho | ........................ | C01G 53/50 |
| | | | | 429/223 |
| 2017/0256790 A1 | 9/2017 | Hiratsuka | | |
| 2019/0103605 A1 | 4/2019 | Saitou et al. | | |
| 2020/0235376 A1 | 7/2020 | Hiratsuka | | |

FOREIGN PATENT DOCUMENTS

| | | |
|---|---|---|
| CN | 108878795 A | 11/2018 |
| EP | 2 067 196 B1 | 2/2018 |
| JP | 6323117 B2 | 5/2018 |
| WO | 2017/169184 A1 | 10/2017 |
| WO | 2018/155121 A1 | 8/2018 |
| WO | WO 2018/155121 | 8/2018 |

OTHER PUBLICATIONS

Written Opinion for International Application PCT/CN2019/120511.
WO 2018/155121 A1_English Translation.
JP 6323117 B2_English Translation.
Supplementary Search Report issued on Aug. 30, 2021 in European corresponding application No. EP 19 90 3072.
Chinese Search Report dated Nov. 20, 2020 issued in corresponding Chinese Application No. 2018116373715.

* cited by examiner

PRESSURE-RESISTANT POSITIVE ACTIVE MATERIAL AND ELECTROCHEMICAL ENERGY STORAGE APPARATUS

CROSS-REFERENCE TO RELATED APPLICATIONS

This application is a national phase entry under 35 USC 371 of International Patent Application No: PCT/CN2019/120511 filed on 25 Nov. 2019, which claims the benefit of Chinese Patent Application No. 201811637371.5 filed on Dec. 29, 2018 and Chinese Patent Application No. 201811611482.9 filed Dec. 27, 2018, which are incorporated herein by reference in its entirety.

TECHNICAL FIELD

This application relates to the field of battery technologies, and in particular, to a pressure-resistant positive active material and an electrochemical energy storage apparatus.

BACKGROUND

With escalation of energy crisis and environmental issues, development of new-type green energy sources becomes extremely urgent. Lithium-ion batteries have been applied to various fields because of their advantages of high specific energy, use in a wide temperature range, low self-discharge rate, long cycle life, good safety performance, and no pollution. Using lithium-ion batteries as a vehicle energy system to replace conventional diesel locomotives has been gradually put into trial around the world. However, lithium iron phosphate ($LiFePO_4$) and low nickel ternary ($LiNi_{1/3}Cp_{1/3}Mn_{1/3}O_2$) commonly used at present are limited by the material nature itself and cannot fully meet energy density requirements of traction batteries on the positive active material of the lithium-ion batteries. Increasing nickel content of a high nickel ternary positive electrode material can improve the energy density of the batteries. Therefore, the high nickel ternary positive electrode material is one of main research subjects of the traction batteries. However, the increased nickel content obviously aggravates direct side reactions between the positive active material and an electrolyte, and greatly deteriorates cycle performance, which is one of bottlenecks of mass production and commercialization.

At present, main means for resolving cycle performance issues in terms of material are optimizing content of main elements, doping, and using coating modification techniques. With the three means, the cycle performance can be improved to some extent, but still has a gap to the market demand. Due to high nickel content, high surface activity, and easy side reaction with the electrolyte, the cycle performance of the polycrystalline high nickel ternary material deteriorates obviously, which is one of main difficulties for application in the current market. It is found through researches that the ternary positive electrode material has a phenomenon of particle crushing during cycling, and it is found through battery core failure analysis that particle crushing is a main reason for the deteriorated cycle performance of battery cores. Therefore, how to address the particle crushing problem during cycling is particularly important for improvement of the cycle performance.

SUMMARY

In view of the disadvantages in the prior art, an objective of this application is to provide a positive active material with a compact structure and good pressure-resistant performance, and an electrochemical energy storage apparatus using the positive active material, so as to improve a cycle life of a battery, control a volume swelling rate in a cycle process, and improve kinetic performance of the battery by using the positive active material with good mechanical strength and good ionic conductivity.

In order to achieve the above and other related objectives, one aspect of this application provides a positive active material, where the positive active material includes secondary particles composed of primary particles, a quantity σ of primary particles per unit area in a SEM profile of the positive active material is $5/\mu m^2$ to $30/\mu m^2$, and a single-particle pressure-resistant strength of the secondary particles is 60 MPa to 300 MPa; and a molecular formula of the positive active material is $Li_xNi_yCo_zM_kMe_pO_rA_m$, where $0.95 \leq x \leq 1.05$, $0 \leq y \leq 1$, $0 \leq z \leq 1$, $0 \leq k \leq 1$, $0 \leq p \leq 0.1$, $1 \leq r \leq 2$, $0 \leq m \leq 2$, $m+r \leq 2$, M is selected from Mn and/or Al, Me is selected from any one or a combination of Zr, Zn, Cu, Cr, Mg, Fe, V, Ti, Sr, Sb, Y, W, and Nb, and A is selected from any one or a combination of N, F, S, and Cl.

Another aspect of this application provides a positive electrode material, including the positive active material according to this application, where an outer coating layer is provided on the surface of the positive active material, the outer coating layer includes a coating element, and the coating element of the outer coating layer is selected from any one or a combination of Al, Ba, Zn, Ti, Co, W, Y, Si, Sn, B, and P.

Another aspect of this application provides a method for determining a quantity of primary particles per unit sphere surface area of secondary particles in the positive active material or the positive electrode material in this application, including the following steps:

(1) selecting a positive active material sample whose particle size is an average secondary-particle size $D_v50 \pm 20\%$, and conducting SEM-based testing on the sample, to obtain a 10K-times magnified SEM graph;

(2) based on the SEM graph obtained in step (1), calculating the quantity σ of primary particles per unit sphere surface area in the positive active material by using the following formula:

$$\sigma = (x1+x2)/2 * (y1+y2)/2/(A/C*B/C)$$

where x1 represents a quantity of primary particles in a horizontal direction on a lower edge of the 10K-times magnified SEM image of the secondary particles;

x2 represents a quantity of primary particles in a horizontal direction on an upper edge of the 10K-times magnified SEM image of the secondary particles;

y1 represents a quantity of primary particles in a longitudinal direction on a left edge of the 10K-times magnified SEM image of the secondary particles;

y2 represents a quantity of primary particles in a longitudinal direction on a right edge of the 10K-times magnified SEM image of the secondary particles;

A represents an actual measured horizontal length of the 10K-times magnified SEM image of the secondary particles, measured in mm;

B represents an actual measured longitudinal length of the 10K-times magnified SEM image of the secondary particles, measured in mm; and C represents an actual measured length of the 10K-times magnified SEM image of the secondary particles, corresponding to a scale of 1 μm and measured in mm/μm; where during calculation of the quantity of primary particles in the 10K-times magnified SEM image of the secondary particles, a primary particle with presence of a portion is counted as one primary particle.

Another aspect of this application provides an electrochemical energy storage apparatus, including the positive active material or the positive electrode material of this application.

Compared with the prior art, the beneficial effects of this application are as follows:

The positive active material of this application includes secondary particles composed of primary particles. The secondary particles have a compact structure, a high pressure-resistant strength, and a moderate ion transmission distance to effectively address the particle crushing problem during cycling and avoid gassing caused by particle crushing, and also feature good ionic conductivity. Therefore, the lithium-ion battery using the positive active material of this application has good cycle performance, a low volume swelling rate, and good kinetic performance.

DESCRIPTION OF EMBODIMENTS

Figure 1:
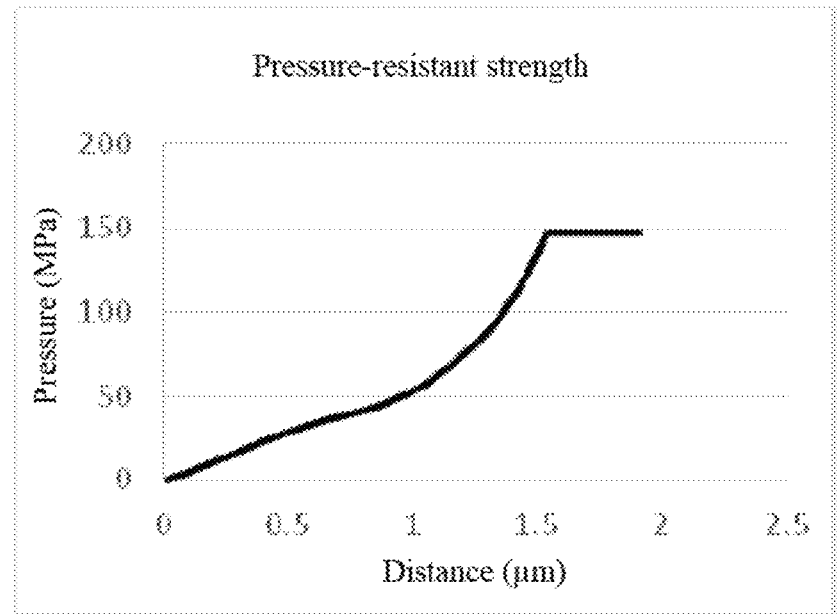
FIG. 1 is a curve graph of pressure-resistant strength of particles according to Example 4 of this application.
Figure 2:
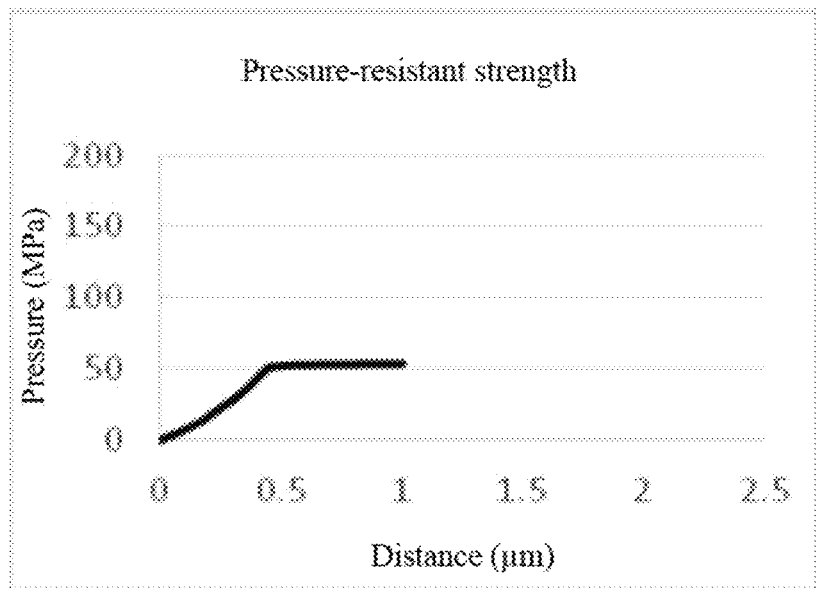
FIG. 2 is a curve graph of pressure-resistant strength of particles according to Comparative Example 3 of this application.
Figure 3:
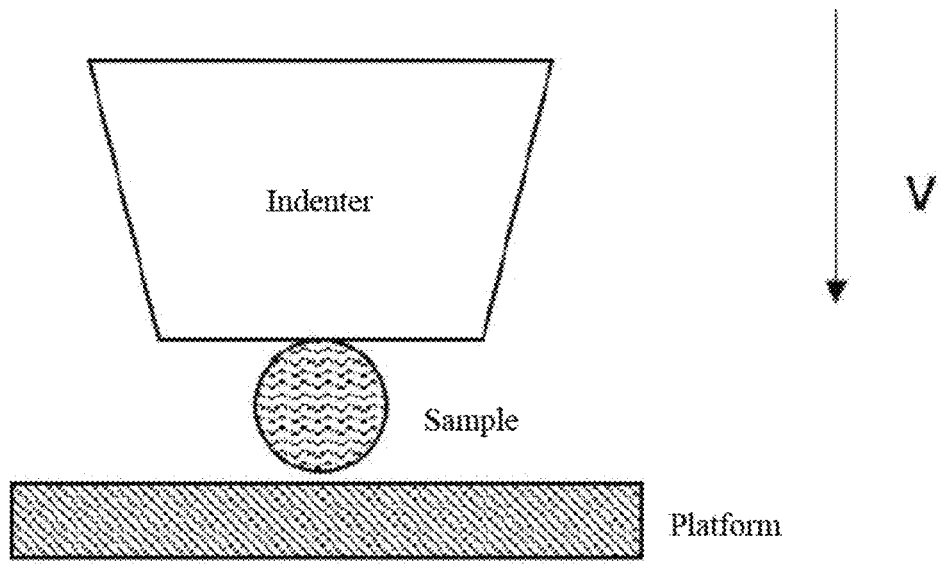
FIG. 3 is a diagram of a pressure-resistant strength testing apparatus according to this application.

The following describes in detail a positive active material, a positive electrode material, and an electrochemical energy storage apparatus using the positive active material or the positive electrode material according to this application.

A first aspect of this application provides a positive active material, where the positive active material includes secondary particles composed of primary particles, a quantity σ of primary particles per unit sphere surface area in a SEM profile of the secondary particles is $5/\mu m^2$ to $30/\mu m^2$, and a single-particle pressure-resistant strength of the secondary particles is 60 MPa to 300 MPa; and a molecular formula of the positive active material is $Li_xNi_yCo_zM_kMe_pO_rA_m$, where $0.95 \le x \le 1.05$, $0 \le y \le 1$, $0 \le z \le 1$, $0 \le k \le 1$, $0 \le p \le 0.1$, $1 \le r \le 2$, $0 \le m \le 2$, $m+r \le 2$, M is selected from Mn and/or Al, Me is selected from any one or a combination of Zr, Zn, Cu, Cr, Mg, Fe, V, Ti, Sr, Sb, Y, W, and Nb, and A is selected from any one or a combination of N, F, S, and Cl. The positive active material of lithium transition metal oxide is secondary particles composed of primary particles. Compared with monocrystalline particles, the secondary particles feature smaller polarization, and can effectively reduce internal resistance of the lithium-ion battery. However, there are some gaps between the primary particles in the secondary particles and the primary particles have obviously different cohesion due to different synthesis processes; therefore, the quantity of primary particles per unit sphere surface area of the secondary particles can be controlled to improve compactness of a surface structure of the secondary particles. The positive active material of this application has higher compactness for a surface structure, good single-particle pressure-resistant strength, and a moderate ion transmission distance, which can address the particle crushing problem during cycling and ensure good ionic conductivity for the positive active material. This ensures that the lithium-ion battery using the positive active material of this application has good cycle performance, a low volume swelling rate, and good kinetic performance.

In the positive active material provided in this application, the positive active material is a lithium transition metal oxide. Because some element content is precipitated during preparation, the lithium element in the molecular formula of the positive active material may be lithium-deficient or lithium-rich to some extent. The relative content of the lithium element in a range of $0.95 \le x \le 1.05$ imposes slight influence on a capacity of the positive active material. Optionally, the relative content of the lithium element is $0.95 \le x \le 1$ or $1 \le x \le 1.05$.

In the positive active material provided in this application, preferably, the positive active material is a ternary lithium transition metal oxide containing Ni, Co, and at least one element of Mn or Al. The molecular formula of the positive active material: $0 \le y \le 1$, $0 \le z \le 1$, $0 \le k \le 1$, $0 \le p \le 0.1$, $1 \le r \le 2$, $0 \le m \le 2$, and $m+r \le 2$.

As a further preferred manner of this application, the positive active material is a high nickel positive active material, and in the molecular formula of the positive active material, $0.50 \le y \le 0.95$, $0.05 \le z \le 0.2$, $0.05 \le k \le 0.4$, and $0 \le p \le 0.05$. Specifically, the positive active material may be $LiNi_{1/3}Co_{1/3}Mn_{1/3}O_2$, $LiNi_{0.5}Co_{0.2}Mn_{0.3}O_2$, $LiNi_{0.5}Co_{0.25}Mn_{0.25}O_2$, $LiNi_{0.55}Co_{0.15}Mn_{0.3}O_2$, $LiNi_{0.55}Co_{0.1}Mn_{0.35}O_2$, $LiNi_{0.55}Co_{0.05}Mn_{0.4}O_2$, $LiNi_{0.6}Co_{0.2}Mn_{0.2}O_2$, $LiNi_{0.75}Co_{0.01}Mn_{0.15}O_2$, $LiNi_{0.8}Co_{0.1}Mn_{0.1}O_2$, $LiNi_{0.85}Co_{0.05}Mn_{0.1}O_2$, $LiNi_{0.88}Co_{0.05}Mn_{0.07}O_2$, $LiNi_{0.9}Co_{0.05}Mn_{0.05}O_2$, $LiNi_{0.72}Co_{0.18}Al_{0.1}O_2$, and $LiNi_{0.81}Co_{0.045}Mn_{0.045}Al_{0.1}O_2$, or may be an active material obtained through modification and partial substitution of Me and/or A based on the foregoing materials, where Me is selected from any one or a combination of Zr, Zn, Cu, Cr, Mg, Fe, V, Ti, Sr, Sb, Y, W, and Nb, and A is selected from any one or a combination of N, F, S, and Cl.

More preferably, in the molecular formula of the positive active material, $0.70 \le y \le 0.95$, $0 \le z \le 0.2$, $0 \le k \le 0.2$, and $0 \le p \le 0.05$.

In this application, a positive active material with higher nickel content is selected as the positive active material. A higher relative content of the Ni element indicates a higher theoretical gram capacity of the material, which can effectively increase the volume energy density of the battery. However, the high nickel positive active material has higher residual lithium content on the surface and the particles are more likely to be broken. Therefore, the surface compactness and single-particle pressure-resistant strength of the secondary particles of the high nickel positive active material can be controlled to effectively resolve the gassing problem of the high-capacity batteries during cycling, and improve the energy density and service life of the batteries.

In the positive active material provided in this application, the single-particle pressure-resistant strength of the secondary particles is "a minimum pressure when one single secondary particle whose particle size fluctuates 10% above or below an average particle size $D_v50$ is crushed under external force." The single-particle pressure-resistant strength of the secondary particles in this application is selected from 60 MPa to 300 MPa, 60 MPa to 80 MPa, 80 MPa to 100 MPa, 100 MPa to 120 MPa, 120 MPa to 150 MPa, 150 MPa to 180 MPa, 180 MPa to 200 MPa, 200 MPa to 220 Mpa, 220 MPa to 240 Mpa, 240 MPa to 260 MPa, 260 MPa to 280 MPa, or 280 MPa to 300 MPa.

In the positive active material provided in this application, a powder compacted density of the positive active material is not less than 3.3 g/cm³. Because of good pressure-resistant performance and high powder compacted density, the positive active material in this application can withstand larger pressure without breaking during electrode plate preparation, thereby improving the compacted density of the positive electrode plate and improving the volume energy density of the battery.

In the positive active material provided in this application, the secondary particles have $D_v10$ of 2 μm to 8 μm, $D_v50$ of 5 μm to 18 μm, and $D_v90$ of 10 μm to 30 μm. Optionally, $D_v10$ is 2 μm to 3 μm, 3 μm to 4 μm, 4 μm to 5 μm, 5 μm to 6 μm, 6 μm to 7 μm, or 7 μm to 8 μm; $D_v50$ is 5 μm to 18 μm, 5 μm to 8 μm, 8 μm to 10 μm, 10 μm to 12 μm, 12 μm to 15 μm, or 15 μm to 18 μm; and $D_v90$ is 10 μm to 30 μm, 10 μm to 15 μm, 15 μm to 20 μm, 20 μm to 25 μm, or 25 μm to 30 μm.

In the positive active material provided in this application, the secondary particles are obtained by stacking the primary particles in an extension direction of the primary particles; the primary particles are rod-shaped, cone-shaped, or needle-shaped; and the primary particles extend and are stacked in a radial direction to form the secondary particles. The primary particles have a length of 100 nm to 1000 nm and a cross-sectional width of 50 nm to 400 nm. Optionally, the primary particles have a length of 100 nm to 1000 nm, 100 nm to 200 nm, 200 nm to 300 nm, 300 nm to 400 nm, 400 nm to 500 nm, 500 nm to 600 nm, 600 nm to 700 nm, 700 nm to 800 nm, 800 nm to 900 nm, or 900 nm to 1000 nm, and have a cross-sectional width of 50 nm to 400 nm, 50 nm to 100 nm, 100 nm to 150 nm, 150 nm to 200 nm, 200 nm to 300 nm, 300 nm to 350 nm, or 350 nm to 400 nm.

In a preferred manner of this application, a ratio of the length to the radial cross-sectional width of the primary particles is 2 to 20, 2 to 5, 5 to 8, 8 to 10, 10 to 12, 12 to 15, 15 to 18, or 18 to 20.

In the positive active material provided in this application, a BET of the secondary particles is 0.3 m²/g to 0.8 m²/g, 0.3 m²/g to 0.4 m²/g, 0.4 m²/g to 0.5 m²/g, 0.5 m²/g to 0.6 m²/g, 0.6 m²/g to 0.7 m²/g, or 0.7 m²/g to 0.8 m²/g.

In the positive active material provided in this application, with the volume particle size distribution of the secondary particles within the foregoing range, a relatively low specific surface area of the positive active material and a moderate ion transmission distance can be ensured. When the particle size of the secondary particles is within the foregoing range, a length, a width, and a ratio of the length to the radial cross-sectional width of the primary particles can be further controlled to be in the foregoing ranges. This ensures a higher density for the surface and internal structure of the formed secondary particles and a moderate lithium-ion transmission distance between the primary particles, and further improves the mechanical strength of the secondary particles.

In the positive active material provided in this application, an inner coating layer is provided on the surface of at least a portion of the primary particles at non-outermost positions of the secondary particles, the inner coating layer includes a coating element, and the coating element of the inner coating layer is selected from any one or a combination of Al, Ba, Zn, Ti, Co, W, Y, Si, Sn, B, and P. The coating element of the inner coating layer is not reflected in the molecular formula $Li_xNi_yCo_zM_kMe_pO_rA_m$ of the positive active material. Generally, the coating element of the inner coating layer does not enter the lattice.

In a preferred manner of this application, the coating element of the inner coating layer is selected from at least two or more of Al, Ba, Zn, Ti, Co, W, Y, Si, Sn, B, and P. In this application, the inner coating layer on the surface of the primary particles contains an oxide formed by at least two or more of the foregoing elements, which can improve stability of the inner coating layer on the surface of the primary particles. In this way, the inner coating layer has ionic conductivity and electronic conductivity to some extent, thereby reducing influence of the inner coating layer on the polarization problem of the positive active material. This effectively avoids direct contact between the positive active material and the electrolyte, reduces side reaction with the electrolyte, avoids a large amount of gas generated during cycling, and ensures lower impedance and better cycle and rate performance for the battery.

A second aspect of this application provides a positive electrode material, including the positive active material according to the first aspect of this application. An outer coating layer is provided on the surface of the positive active material, and a coating element of the outer coating layer is selected from any one or a combination of Al, Ba, Zn, Ti, Co, W, Y, Si, Sn, B, and P.

In a preferred manner of this application, in addition to the outer coating layer provided on the surface of the positive electrode material, an inner coating layer is provided on the surface of at least a portion of the primary particles at non-outermost positions of the secondary particles. Further preferably, the outer coating layer and the inner coating layer are made of the same coating material.

In a preferred manner of this application, the coating element of the outer coating layer is selected from at least two or more of Al, Ba, Zn, Ti, Co, W, Y, Si, Sn, B, and P. In this application, the outer coating layer on the surface of the positive active material contains an oxide formed by at least two or more of the foregoing elements, which can improve stability of the outer coating layer on the surface of the positive active material. In this way, the outer coating layer has ionic conductivity and electronic conductivity, thereby reducing influence of the outer coating layer on the polarization problem of the positive active material. This effectively avoids direct contact between the positive active material and the electrolyte, reduces side reaction with the electrolyte, avoids a large amount of gas generated during cycling, and ensures lower impedance and better cycle and rate performance for the battery.

In the positive electrode material provided in this application, the outer coating layer is a continuous and/or discontinuous laminar coating layer; preferably, the outer coating layer is a composite form of a continuous first coating layer and a discontinuous second coating layer; more preferably, a substance of the discontinuous coating layer is different from a substance of the continuous coating layer. An element forming the discontinuous coating layer is selected from any one or a combination of Al, Ba, Zn, Ti, and Co, and an element forming a continuous coating layer is selected from any one or a combination of W, Y, Si, B, P, and Sn.

In the positive electrode material provided in this application, the discontinuous laminar coating layer may be a discrete island-shaped outer coating layer, and the discontinuous coating layer may act as a "nanonail" on the surface of the positive active material, so as to be firmly bonded to the positive active material, effectively reducing a particle crushing probability of the positive active material during cycling. In addition, the discontinuous laminar coating layer can also enhance the bonding force between the primary particles of the positive active material, so that the positive active material (especially in the form of secondary particles that are formed by agglomerating the primary particles) has a higher overall mechanical strength and is not prone to breakage. In addition, a continuous coating layer is also formed on the surface of the positive active material, thereby effectively reducing roughness of the surface of the positive electrode material and reducing a specific surface area of the positive electrode material. This can reduce an effective contact area between the surface of the positive electrode material and the electrolyte, reduce the side reaction between the surface of the positive electrode material and the electrolyte, and avoid a large amount of gas generated due to the side reaction between the surface of the positive electrode material and the electrolyte.

A third aspect of this application provides a method for determining a quantity of primary particles per unit sphere surface area of secondary particles in the positive active material in the first aspect of this application or the positive electrode material in the second aspect of this application, including the following steps:

(1) selecting a positive active material sample whose particle size is an average secondary-particle size $D_v 50 \pm 20\%$, and conducting SEM-based testing on the sample, to obtain a 10K-times magnified SEM graph;

(2) based on the SEM graph obtained in step (1), calculating the quantity $\sigma$ (quantity/$\mu m^2$) of primary particles per unit area in the positive active material by using the following formula:

$$\sigma = (x1+x2)/2*(y1+y2)/2(A/C*B/C)$$

where x1 represents a quantity of primary particles in a horizontal direction on a lower edge of the 10K-times magnified SEM image of the secondary particles;

x2 represents a quantity of primary particles in a horizontal direction on an upper edge of the 10K-times magnified SEM image of the secondary particles;

y1 represents a quantity of primary particles in a longitudinal direction on a left edge of the 10K-times magnified SEM image of the secondary particles;

y2 represents a quantity of primary particles in a longitudinal direction on a right edge of the 10K-times magnified SEM image of the secondary particles;

A represents an actual measured horizontal length of the 10K-times magnified SEM image of the secondary particles, measured in mm;

B represents an actual measured longitudinal length of the 10K-times magnified SEM image of the secondary particles, measured in mm; and C represents an actual measured length of the 10K-times magnified SEM image of the secondary particles, corresponding to a scale of 1 μm and measured in mm/μm; where during calculation of the quantity of primary particles in the 10K-times magnified SEM image of the secondary particles, a primary particle with presence of a portion is counted as one primary particle.

In this application, the quantity $\sigma$ of primary particles per unit sphere surface area can be represented intuitively by using the foregoing method, to truly reflect the size and distribution of the primary particles on the surface of the secondary particles. Compared with representation of only the crystal sizes of the primary particles and the secondary particles, the method for calculating the quantity of primary particles in the 10K-times magnified SEM image of the secondary particles is an effective way to objectively represent the compactness degree of the spherical structure of the secondary particles composed of the primary particles.

A fourth aspect of this application provides a method for preparing the positive active material according to the first aspect of this application. The method for preparing the positive active material should be known to those skilled in the art. For example, the method may include: selecting suitable raw materials and proportions of the positive active material by those skilled in the art based on element composition of the positive active material. For example, the raw materials of the positive active material may include a ternary material precursor of nickel-cobalt-manganese and/or aluminum, a lithium source, a Me source, an A source, and the like, and a proportion of each raw material is generally proportional to a proportion of each element in the positive active material. More specifically, the ternary material precursor may include but is not limited to $Ni_{1/3}Co_{1/3}Mn_{1/3}(OH)_2$, $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al(OH)_3$, and $0.9Ni_{0.9}Co_{0.05}Mn_{0.05}(OH)_2 \cdot 0.1Al(OH)_3$. The lithium source may be a compound containing lithium, and the compound containing lithium may include but is not limited to any one or a combination of $LiOH \cdot H_2O$, $LiOH$, $Li_2CO_3$, $Li_2O$, and the like. The Me source may usually be a compound containing a Me element, and the compound containing the Me element may be one or more of an oxide containing at least one element of Zr, Zn, Cu, Cr, Mg, Fe, V, Ti, Sr, Sb, Y, W, and Nb, nitrate, and carbonate. The A source may be a compound containing the A element, and the compound containing the A element may include but is not limited to any one or a combination of LiF, NaCl, $Na_2S$, $Li_3N$, and the like. For another example, the sintering condition may be 800° C. with an oxygen concentration of ≥20%.

The method for preparing the positive active material may further include providing an inner coating layer on the surface of at least a portion of the primary particles at non-outermost positions of the secondary particles, and a method for forming the inner coating layer on the surface of the primary particles is known to those skilled in the art. For example, the method may include sintering the primary particles under a condition with presence of a compound containing a coating element, to form the inner coating layer on the surface of the primary particles. For another example, when the inner coating material is the same as the outer coating material, the inner coating process and the outer coating process may be combined into a one-step process, and the coating material may pass through the surface of the secondary particles and inner pores, to coat both the outer surface of the secondary particles and at least a part of the inner primary particles. Based on parameters such as the composition of the inner coating layer, the powder pressure-resistant strength of the positive active material, and the resistivity of the powder, those skilled in the art can properly select a type of the compound containing the coating element, a proportion, and a sintering condition. For example, the compound containing the coating element may be an oxide containing one or more elements of Al, Ba, Zn, Ti, Co, W, Y, Si, Sn, B, and P, nitrate, phosphate, carbonate, and the like. For another example, the compound containing the coating element may be used in an amount of 0.01% to 0.5%. For still another example, the sintering condition may be a high temperature of 200° C. to 700° C.

A fifth aspect of this application provides a method for preparing the positive electrode material according to the second aspect of this application, including: forming an outer coating layer on the surface of the positive active material according to the first aspect of this application.

The method for forming the outer coating layer on the surface of the positive active material should be known to those skilled in the art, and for example, may include: sintering the positive active material under a condition with presence of a compound containing a coating element, so as to form the outer coating layer on the surface of the positive active material. Based on parameters such as the composition of the outer coating layer, the powder pressure-resistant strength of the positive active material, and the resistivity of the powder, those skilled in the art can properly select a type of the compound containing the coating element, a proportion, and a sintering condition. For example, the compound containing the coating element may be an oxide containing one or more elements of Al, Ba, Zn, Ti, Co, W, Y, Si, Sn, B, and P, nitrate, phosphate, carbonate, and the like. For another example, the compound containing the coating element may be used in an amount of 0.01% to 0.5%. For still another example, the sintering condition may be a high temperature of 200° C. to 700° C.

A sixth aspect of this application provides an electrochemical energy storage apparatus, including the positive active material according to the first aspect of this application or the positive electrode material according to the second aspect of this application.

In the electrochemical energy storage apparatus according to the sixth aspect of this application, it should be noted that the electrochemical energy storage apparatus may be a super capacitor, a lithium-ion battery, a lithium metal battery, or a sodium ion battery. In the embodiments of this application, an embodiment in which the electrochemical energy storage apparatus is a lithium-ion battery is merely illustrated, but this application is not limited thereto.

The lithium-ion battery includes a positive electrode plate, a negative electrode plate, a separator disposed between the positive electrode plate and the negative electrode plate, and an electrolyte, where the positive electrode plate includes the positive active material according to the first aspect of this application or the positive electrode material according to the second aspect of this application. The method for preparing the lithium-ion battery should be known to those skilled in the art, for example, each of the positive electrode plate, the separator, and the negative electrode plate may be a layer, and therefore may be cut to a target size and then sequentially laminated, or may be wound to a target size, so as to form a battery core and further form the lithium-ion battery by combining with an electrolyte.

In the lithium-ion battery, the positive electrode plate includes a positive current collector and a positive electrode material layer located on the positive current collector, and the positive electrode material layer includes the positive active material according to the first aspect of this application or the positive electrode material according to the second aspect of this application, a binder, and a conductive agent. Those skilled in the art may select a suitable method for preparing the positive electrode plate, for example, the following steps may be included: mixing the positive active material or the positive electrode material, the binder, and the conductive agent to obtain a slurry, and applying the slurry on the positive current collector. The binder usually includes a fluoropolyene-based binder, and water is generally a good solvent relative to the fluoropolyene-based binder, that is, the fluoropolyene-based binder usually features good solubility in water, for example, the fluoropolyene-based binder may be a derivative including, but not limited to, polyvinylidene fluoride (PVDF), vinylidene fluoride copolymer, or the like, or their modified derivatives (for example, carboxylic acid, acrylic, or acrylonitrile). The conductive agent may be a variety of conductive agents applicable to lithium-ion (secondary) batteries in the art, for example, may include but is not limited to any one or a combination of acetylene black, conductive carbon black, vapor grown carbon fiber (VGCF), carbon nanotube (CNT), Ketj en black, or the like. The positive current collector may usually be a layer, and the positive current collector may usually be a structure or part that can collect current. The positive current collector may be a variety of materials suitable for use as the positive current collector of the lithium-ion battery in the art. For example, the positive current collector may include but is not limited to metal foil, and more specifically, may include but is not limited to copper foil, aluminum foil, and the like.

In the lithium-ion battery, the negative electrode plate usually includes a negative current collector and a negative active substance layer on the surface of the negative current collector, and the negative active substance layer usually includes a negative active substance. The negative active substance may be various materials applicable to the negative active substance for the lithium-ion battery in the art, for example, may include but is not limited to any one or a combination of graphite, soft carbon, hard carbon, carbon fiber, mesophase carbon microbeads, silicon-based material, tin-based material, lithium titanate, or other metals capable of forming alloys with lithium. The graphite may be selected from any one or a combination of artificial graphite, natural graphite and modified graphite. The silicon-based material may be selected from any one or a combination of elemental silicon, silicon oxide, silicon carbon composite, and silicon alloy. The tin-based material may be selected from any one or a combination of elemental tin, tin oxide, and tin alloy. The negative current collector may usually be a structure or part that can collect current. The negative current collector may be a variety of materials suitable for use as the negative current collector of the lithium-ion battery in the art. For example, the negative current collector may include but is not limited to metal foil, and more specifically, may include but is not limited to copper foil and the like.

In the lithium-ion battery, the separator may be a variety of materials applicable to the separator for the lithium-ion battery in the art, for example, may include but is not limited to any one or a combination of polyethylene, polypropylene, polyvinylidene fluoride, aramid, polyethylene terephthalate, polytetrafluoroethylene, polyacrylonitrile, polyimide, polyamide, polyester, natural fiber, and the like.

In the lithium-ion battery, the electrolyte may be a variety of electrolytes applicable to the lithium-ion battery in the art, for example, the electrolyte generally includes an electrolyte substance and a solvent, the electrolyte substance may generally include a lithium salt or the like, more specifically, the lithium salt may be an inorganic lithium salt and/or organic lithium salt or the like, and specifically, the lithium salt may be selected from, including but not limited to, any one or a combination of $LiPF_6$, $LiBF_4$, $LiN(SO_2F)_2$ (LiFSI for short), $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, a concentration of the electrolyte substance may be between 0.8 mol/L to 1.5 mol/L. The solvent may be various solvents applicable to the electrolyte of the lithium-ion battery in the art, and the solvent of the electrolyte is usually a non-aqueous solvent, preferably may be an organic solvent, and specifically, may include but is not limited to any one or a combination of ethylene carbonate, propylene carbonate, butylene carbonate, pentene carbonate, dimethyl carbonate, diethyl carbonate, dipropyl carbonate, ethyl methyl carbonate, and the like, or halogenated derivatives thereof.

The following further describes beneficial effects of this application in combination with Examples.

In order to make the objectives, technical solutions, and beneficial technical effects of this application clearer, the following further describes this application in detail in combination with Examples. However, it should be understood that Examples of this application are merely intended to explain this application, and are not intended to limit this application, and Examples of this application are not limited to Examples provided in the specification. Examples whose experimental or operating conditions are not specified are made under conventional conditions, or under conditions recommended by the material suppliers.

In addition, it should be understood that the one or more method steps mentioned in this application do not preclude existence of other method steps before and after the combination steps or insertion of other method steps between those explicitly mentioned steps, unless otherwise specified. It should also be understood that the combination and connection relationship between one or more devices/apparatuses mentioned in this application does not preclude existence of other devices/apparatuses before or after the combination apparatuses or insertion of other apparatuses between those explicitly mentioned devices/apparatuses, unless otherwise specified. Moreover, unless otherwise specified, numbers of the method steps are merely a tool for identifying the method steps, but are not intended to limit the order of the method steps or to limit the implementable scope of this application. In the absence of substantial changes in the technical content, alteration or adjustment of their relative relationships shall be also considered as the implementable scope of this application.

The reagents, materials, and instruments used in the following Examples are commercially available, unless otherwise specially specified.

I. Preparation of a Battery

Example 1

1. Preparation of a Positive Electrode Material

1) Nickel sulfate, manganese sulfate, and cobalt sulfate were configured in a molar ratio of 8:1:1 to obtain a solution with a concentration of 1 mol/L, and a nickel-cobalt-manganese ternary material precursor $Ni_{0.8}Co_{0.01}Mn_{0.1}(OH)_2$ was prepared by using a hydroxide co-precipitation technology. In the process of preparing the precursor, an initial pH value for co-precipitation was controlled to be 9.5, an ammonia concentration was controlled to be 0.4M, and an aging time after reaction was 5 h.

2) The Nickel-cobalt-manganese Ternary Material Precursor $Ni_{0.8}Co_{0.1}Mn_{0.1}(OH)_2$ and Li-containing compound $LiOH \cdot H_2O$ were mixed in a molar ratio of 1:1.05 in a mixer, and then were sintered in an atmosphere furnace at 800° C. and were cooled and mechanically ground to form a positive active material matrix. The positive active material matrix and an additive $Al_2O_3$ were mixed in the mixer in a mass ratio of 100:0.3, and then were sintered in the atmosphere furnace at 450° C. to form the positive electrode material coated with $Al_2O_3$.

2. Preparation of a Positive Electrode Plate

Step 1: The prepared positive electrode material, a binder polyvinylidene fluoride, and a conductive agent acetylene black were mixed in a mass ratio of 98:1:1. N-methylpyrrolidone (NMP) was added. The resulting mixture was stirred by using a vacuum mixer until the mixture was stable and uniform, to obtain a positive slurry. The positive slurry was applied uniformly on an aluminum foil with a thickness of 12 μm.

Step 2: The coated electrode plate was dried in an oven at 100° C. to 130° C.

Step 3: The positive electrode plate was obtained by cold pressing and cutting.

3. Preparation of a Negative Electrode Plate

A negative active material graphite, a thickener sodium carboxymethyl cellulose, a binder styrene-butadiene rubber, and an conductive agent acetylene black were mixed in a mass ratio of 97:1:1:1. Deionized water was added. The resulting mixture was stirred by using a vacuum mixer until the mixture was stable and uniform, to obtain a negative slurry. The negative slurry was uniformly applied onto a copper foil with a thickness of 8 μm. The copper foil was dried at room temperature, and then dried in an oven at 120° C. for 1 h. Then the copper foil was cold-pressed and cut to obtain a negative electrode plate.

4. Preparation of an Electrolyte

A mixed solution of ethyl carbonate (EC), ethyl methyl carbonate (EMC), and diethyl carbonate (DEC) in a volume ratio of 20:20:60 was used as an organic solvent. A fully dried lithium salt with a concentration of 1 mol/L was then dissolved and evenly mixed in the organic solvent by using an argon atmosphere glove box with a water content of <10 ppm, to obtain an electrolyte.

5. Preparation of a Separator

A polypropylene separator with a thickness of 12 μm was selected for use.

6. Preparation of a Battery

The positive electrode plate, the separator, and the negative electrode plate are stacked in order, so that the separator was placed between the positive and negative electrode plates, and has an effect of separation. Then the stack was wound to obtain a square bare battery. The bare battery was placed in an aluminum-plastic film, and then baked at 80° C. for dehydrating. A finished battery was obtained after steps of injecting the corresponding non-aqueous electrolyte, sealing, standing, hot and cold pressing, technical conversion, clamping, and aging.

Example 2

Example 2 is basically the same as Example 1, except for the preparation method of the positive electrode material: In the precursor preparation process, a pH value for co-precipitation was changed to 10.5, an ammonia concentration to 0.3M, and an aging time after reaction to 3 h.

Example 3

Example 3 is basically the same as Example 1, except for the preparation method of the positive electrode material: In the precursor preparation process, a pH value for co-precipitation was changed to 11, an ammonia concentration to 0.2M, and an aging time after reaction to 5 h.

Example 4

Example 4 is basically the same as Example 1, except for the preparation method of the positive electrode material: In the precursor preparation process, a pH value for co-precipitation was changed to 10, an ammonia concentration to 0.4M, and an aging time after reaction to 2 h.

Example 5

Example 5 is basically the same as Example 1, except for the preparation method of the positive electrode material: In the precursor preparation process, a pH value for co-precipitation was changed to 11.5, an ammonia concentration to 0.3M, and an aging time after reaction to 2 h.

Example 6

Example 6 is basically the same as Example 1, except for the preparation method of the positive electrode material: In the precursor preparation process, a pH value for co-precipitation was changed to 9.8, an ammonia concentration to 0.3M, and an aging time after reaction to 4 h.

Example 7

Example 7 is basically the same as Example 1, except for the preparation method of the positive electrode material: The relative contents of Ni, Co, and Mn elements in the precursor were 0.75:0.1:0.15, and in the precursor preparation process, a pH value for co-precipitation was changed to 10.2, an ammonia concentration to 0.5M, and an aging time after reaction to 6 h.

Example 8

Example 8 is basically the same as Example 1, except for the preparation method of the positive electrode material: The relative contents of Ni, Co, and Mn elements in the precursor were 0.6:0.2:0.2, and in the precursor preparation process, a pH value for co-precipitation was changed to 11.5, an ammonia concentration to 0.6M, and an aging time after reaction to 3 h.

Example 9

Example 9 is basically the same as Example 1, except for the preparation method of the positive electrode material: The relative contents of Ni, Co, and Mn elements in the precursor were 0.55:0.15:0.3, and in the precursor preparation process, a pH value for co-precipitation was changed to 11.2, an ammonia concentration to 0.6M, and an aging time after reaction to 3 h.

Example 10

Example 10 is basically the same as Example 1, except for the preparation method of the positive electrode material: The relative contents of Ni, Co, and Mn elements in the precursor were 0.33:0.33:0.33, and in the precursor preparation process, a pH value for co-precipitation was changed to 10.9, an ammonia concentration to 0.4M, and an aging time after reaction to 3 h.

Comparative Example 1

For the preparation method of Comparative Example 1, refer to the preparation method of Example 1 described above, except for the preparation method of the positive electrode material: In the precursor preparation process, a pH value for co-precipitation was changed to 11, an ammonia concentration to 0.5M, and an aging time after reaction to 6 h.

Comparative Example 2

For the preparation method of Comparative Example 2, refer to the preparation method of Example 1 described above, except for the preparation method of the positive electrode material: In the precursor preparation process, a pH value for co-precipitation was changed to 12, an ammonia concentration to 0.6M, and an aging time after reaction to 7 h.

Comparative Example 3

For the preparation method of Comparative Example 3, refer to the preparation method of Example 1 described above, except for the preparation method of the positive electrode material: In the precursor preparation process, a pH value for co-precipitation was changed to 10.5, an ammonia concentration to 0.1M, and an aging time after reaction to 6 h.

II. Performance Tests

The positive electrode materials prepared in Examples 1 to 10 and Comparative Examples 1 to 3 each were tested in terms of a single-particle pressure-resistant s strength, a quantity σ of primary particles, a compacted density, and BET of the secondary particles per unit sphere area. The test results are shown in Table 2.

Figure 4:
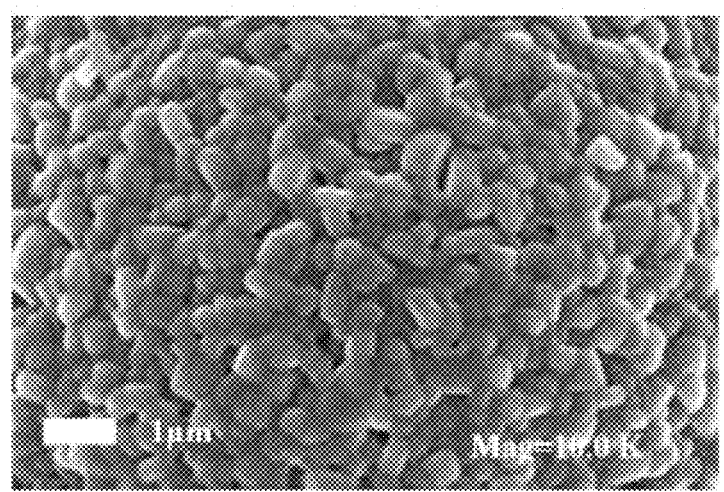
FIG. 4 is a 10K-times magnified SEM image of particles according to Example 1 of this application.

1. Pressure-resistant Strength Test Method
   (1) A sample was placed on a platform.
   (2) An indenter was pressed down to the sample at a speed of 0.1 μm/min until the indenter comes in contact with the sample.
   (3) The pressure and displacement of the indenter started to be recorded at the moment of contact.
   (4) The particles were pressed at a constant speed until the particles were crushed.
2. BET Test Method
   The BET test was conducted by using the international standard test method GB/T19587-2004 Determination of the specific surface area of solids by gas absorption using the BET method.
3. Compacted Density Test Method
   The compacted density test was conducted at a test pressure of 5 tons by using the international standard test method GB/T24533-2009 Graphite negative electrode materials for lithium-ion batteries.
4. Primary Particle Quantity Test Method
   This method was to measure a quantity of primary particles per unit area in the secondary particles. The 10K-times magnified SEM image of the sample prepared in Example 1 was shown in FIG. 4, and the primary particles of the product were calculated as follows:
   The quantity of primary particles per unit area of 1 μm×1 μm was calculated according to the formula σ=(x1+x2)/2*(y1+y2)/2/(A/C*B/C), with the test results shown in Table 1.

$$\sigma_1=(32+32)/2*(22+23)/2/(112/10*75/10)=8.5/\mu m^2$$

The calculation methods of other Examples and Comparative Examples are the same, and the calculation results are shown in Table 2.

TABLE 1

Quantity of primary particles per unit sphere surface area in Example 1

| Product number | SEM image size A B C | Particle quantity Horizontal x1 | Horizontal x2 | Longitudinal y1 | Longitudinal y2 |
|---|---|---|---|---|---|
| Example 1 | 112  75  10 | 32 | 32 | 22 | 23 |

5. Test Method for Battery Cycle Performance

The battery was charged to 4.2V based on 1 C at 2.8V to 4.2V at a constant temperature of 45° C., charged to a current of ≤0.05 mA at a constant voltage of 4.2V, and after standing for 5 min, was then discharged to 2.8V at 1 C. The capacity was denoted as Dn (n=0, 1, 2 . . . ). The preceding process was repeated until the capacity was decreased to 80% of the initial capacity. A quantity of cycles of the lithium-ion battery was recorded. The results of Examples 1 to 10 and Comparative Examples 1 to 3 are shown in Table 3.

6. Test Method for High Temperature Gassing of a Battery

The battery was charged at 1 C to 4.2V and then placed in a thermostat at 70° C. for 30 days. A volume swelling rate of the battery was obtained by measuring an initial volume of the battery and the volume obtained after standing for 30 days.

Volume swelling rate of the battery(%)=(Volume after standing for 30 days/Initial volume−1)× 100%

The test results are shown in Table 3.

7. ⅓C Capacity Test Method

The lithium-ion battery was placed at a constant temperature of 25° C. for 2 h, charged to 4.2V based on ⅓ C at 2.8V to 4.2V, and then charged to a current of ≤0.05 mA at a constant voltage of 4.2V, and after standing for 5 min, then discharged to 2.8V based on 1 C for 5 min. A capacity of the lithium-ion battery was recorded. The capacity test value was divided by the mass of the positive electrode material in the lithium-ion battery, to obtain the ⅓ C capacity of the positive electrode material. The test results are shown in Table 3.

TABLE 2

Powder characterization of the positive active material in Examples 1 to 10 and Comparative Examples 1 to 3

| Test number | Positive active material | σ (quantity/μm) | Pressure-resistant strength (MPa) | Powder compacted density (g/cc) |
|---|---|---|---|---|
| Example 1 | $LiNi_{0.8}Co_{0.1}Mn_{0.1}O_2$ | 8.5 | 90 | 3.34 |
| Example 2 | $LiNi_{0.8}Co_{0.1}Mn_{0.1}O_2$ | 30.1 | 290 | 3.40 |
| Example 3 | $LiNi_{0.8}Co_{0.1}Mn_{0.1}O_2$ | 27.2 | 210 | 3.35 |
| Example 4 | $LiNi_{0.8}Co_{0.1}Mn_{0.1}O_2$ | 20.3 | 150 | 3.38 |
| Example 5 | $LiNi_{0.8}Co_{0.1}Mn_{0.1}O_2$ | 12.1 | 130 | 3.39 |
| Example 6 | $LiNi_{0.8}Co_{0.1}Mn_{0.1}O_2$ | 5.4 | 61 | 3.31 |
| Example 7 | $LiNi_{0.75}Co_{0.1}Mn_{0.15}O_2$ | 18.4 | 100 | 3.35 |
| Example 8 | $LiNi_{0.6}Co_{0.2}Mn_{0.2}O_2$ | 16.2 | 110 | 3.36 |
| Example 9 | $LiNi_{0.55}Co_{0.15}Mn_{0.3}O_2$ | 12.2 | 160 | 3.35 |
| Example 10 | $LiNi_{1/3}Co_{1/3}Mn_{1/3}O_2$ | 15.5 | 150 | 3.37 |
| Comparative Example 1 | $LiNi_{0.8}Co_{0.1}Mn_{0.1}O_2$ | 9.7 | 28 | 3.32 |
| Comparative Example 2 | $LiNi_{0.8}Co_{0.1}Mn_{0.1}O_2$ | 3.1 | 310 | 3.34 |
| Comparative Example 3 | $LiNi_{0.8}Co_{0.1}Mn_{0.1}O_2$ | 32.6 | 50 | 3.34 |

TABLE 3

Electrochemical performance test results of batteries in Examples 1 to 10 and Comparative Examples 1 to 3

| Test number | Cycles at 45° C. | Volume swelling rate | 1/3 C capacity mAh/g |
|---|---|---|---|
| Example 1 | 1085 | 68% | 194 |
| Example 2 | 1302 | 52% | 195 |
| Example 3 | 1256 | 56% | 196 |
| Example 4 | 1226 | 60% | 195 |
| Example 5 | 1164 | 62% | 195 |
| Example 6 | 1025 | 69% | 195 |
| Example 7 | 1564 | 49% | 188 |
| Example 8 | 1831 | 43% | 174 |
| Example 9 | 2014 | 32% | 168 |
| Example 10 | 2423 | 27% | 145 |
| Comparative Example 1 | 325 | 76% | 195 |
| Comparative Example 2 | 853 | 58% | 187 |
| Comparative Example 3 | 235 | 77% | 194 |

It can be learned from Table 2 and Table 3 that relative contents of Ni, Co, and Mn elements in the positive electrode materials of Examples 1 to 6 are the same as those in the positive electrode materials of Comparative Examples 1 to 3. The quantity of primary particles per unit sphere area and the single-particle pressure-resistant strength of the positive electrode materials of Examples 1 to 6 fall within a specified range; therefore, the particles of the positive electrode materials of Examples 1 to 6 have more compact microstructure and higher mechanical strength and better capacity of the powder materials, and the particles are not prone to crushing during electrode plate preparation or cycling. The cycle performance of the lithium-ion batteries prepared by using the positive electrode materials in Examples 1 to 6 is obviously higher than that of Comparative Examples 1 to 3, and the volume swelling rate during cycling is obviously decreased. In Comparative Example 1, the quantity of primary particles per unit sphere area of the positive electrode material is moderate, and the single-particle pressure-resistant strength is relatively low, indicating relatively poor bonding force between the primary particles in the secondary particles. As a result, the compaction of the prepared positive electrode plate is difficult to improve. In addition, the secondary particles are prone to crushing during cold pressing of the electrode plate and cycling, and consequently a large amount of fresh surface of the positive electrode material directly comes in contact with the electrolyte, resulting in relatively severe gassing and relatively poor cycle performance. In Comparative Example 2, the quantity of primary particles per unit sphere area of the positive electrode material is relatively small, and the single-particle pressure-resistant strength is excessively high, indicating an excessively large size of the primary particles in the secondary particles and a relatively small quantity of pores between adjacent primary particles, which results in higher polarization of the positive electrode material and a lower ion transmission rate. Therefore, the internal resistance of the battery is relatively high, thereby degrading the cycle performance of the battery. In Comparative Example 3, the quantity of primary particles per unit sphere area of the positive electrode material is excessively large, and the single-particle pressure-resistant strength is moderate, indicating a relatively small size of the primary particles in the secondary particles of the positive electrode material and a relatively high BET. As a result, the lithium-ion battery formed produces a relatively large amount of gas and has relatively poor cycle performance.

In Examples 7 to 10, relative contents of Ni, Co, and Mn elements in the lithium transition metal oxide of the positive electrode materials were different. The quantity of primary particles per unit sphere area of the positive electrode materials is within a specified range. With the decrease of Ni content, the discharge capacity of the lithium-ion battery is decreased slightly. However, the cycle performance is obviously improved and the gassing problem is obviously mitigated.

The foregoing descriptions are merely preferred embodiments of this application and are not intended to limit this application in any form or essence. It should be noted that those of ordinary skill in the art may also make some improvements and supplements to this application without departing from the methods of this application, and such improvements and supplements shall also be considered as the protection scope of this application. Some equivalent changes of alternations, modifications, and evolution made by using the technical content disclosed above by those skilled in the art without departing from the spirit and scope of this application are equivalent embodiments of this application. In addition, any equivalent changes of alternations, modifications, and evolution on the foregoing embodiments made in accordance with substantive techniques of this application still fall within the scope of the technical solutions of this application.

What is claimed is:

1. A positive active material, wherein the positive active material comprises secondary particles composed of primary particles, the secondary particles have $D_v10$ of 2 μm to 8 μm, $D_v50$ of 5 μm to 18 μm, and $D_v90$ of 10 μm to 30 μm, the primary particles are rod-shaped, cone-shaped, or needle-shaped and have an average length of 200 nm to 1000 nm and an average radial cross-sectional width of 150 nm to 400 nm, an average quantity σ of primary particles per unit sphere surface area in a SEM profile of the secondary particles is 5/μm² to 30/μm², and a single-particle pressure-resistant strength of the secondary particles is 150 MPa to 300 MPa; and a molecular formula of the positive active material is $Li_xNi_yCO_zM_kMe_pO_rA_m$, wherein $0.95 \leq x \leq 1.05$, $0 \leq y \leq 1$, $0 \leq z \leq 1$, $0 \leq k \leq 1$, $0 \leq p \leq 0.1$, $1 \leq r \leq 2$, $0 \leq m \leq 2$, and $m+r \leq 2$, M is selected from Mn and/or Al, Me is selected from any one or a combination of Zr, Zn, Cu, Cr, Mg, Fe, V, Ti, Sr, Sb, Y, W, and Nb, and A is selected from any one or a combination of N, F, S, and Cl, wherein an outer coating layer is provided on a surface of the positive active material, and an inner coating layer is provided on the surface of at least a portion of the primary particles at non-outermost positions of the secondary particles, wherein the inner coating layer comprises a coating element selected from any one or a combination of Ba, Zn, W, Y, and P, and the inner coating layer is 0.01% to 0.5% by weight of the positive active material, wherein the outer coating layer is a composite form of a continuous first coating layer and a discontinuous second coating layer, wherein the continuous first coating layer comprises an oxide of a coating element selected from any one or a combination of W, Y, Si, B, P and Sn, and wherein the discontinuous second coating layer comprises an oxide of a coating element selected from any one or a combination of Zn, and Co, and the outer coating layer is 0.01% to 0.5% by weight of the positive active material;

wherein a powder compacted density of the positive active material is not less than 3.3 g/cm³.

2. The positive active material according to claim 1, wherein in the molecular formula of the positive active material, $0.70 \leq y \leq 0.95$, $0 \leq z \leq 0.2$, $0 \leq k \leq 0.2$, and $0 \leq p \leq 0.05$.

3. The positive active material according to claim 1, wherein the secondary particles are obtained by stacking the primary particles in an extension direction of the primary particles.

4. The positive active material according to claim 1, wherein the secondary particles have a BET of 0.3 m²/g to 0.8 m²/g.

5. An electrochemical energy storage apparatus, comprising the positive active material according to claim 1.

6. The positive active material according to claim 1, wherein a ratio of a length to a radial cross-sectional width of the primary particles is 2 to 10.

7. The positive active material according to claim 1, wherein a substance of the discontinuous second coating layer is different from a substance of the continuous first coating layer.

8. The positive active material according to claim 1, wherein the length of the primary particles is 300 nm to 1000 nm.

9. The positive active material according to claim 1, wherein the length of the primary particles is 500 nm to 1000 nm.

10. The positive active material according to claim 1, wherein the radial cross-sectional width of the primary particles is 200 nm to 400 nm.

11. The positive active material according to claim 1, wherein a ratio of the length to the radial cross-sectional width of the primary particles is 2-5.

12. A method comprising:
preparing a positive active material, wherein the positive active material comprises secondary particles composed of primary particles, the secondary particles have $D_v10$ of 2 μm to 8 μm, $D_v50$ of 5 μm to 18 μm, and $D_v90$ of 10 μm to 30 μm, the primary particles are rod-shaped, cone-shaped, or needle-shaped and have an average length of 200 nm to 1000 nm and an average radial cross-sectional width of 150 nm to 400 nm, an average quantity σ of primary particles per unit sphere surface area in a SEM profile of the secondary particles is 5/μm² to 30/μm², a single-particle pressure-resistant strength of the secondary particles is 150 MPa to 300 MPa, the secondary particles have a BET of 0.3 m²/g to 0.8 m²/g, a molecular formula of the positive active material is $Li_xNi_yCO_zM_kMe_pO_rA_m$, wherein $0.95 \leq x \leq 1.05$, $0 \leq y \leq 1$, $0 \leq z \leq 1$, $0 \leq k \leq 1$, $0 \leq p \leq 0.1$, $1 \leq r \leq 2$, $0 \leq m \leq 2$, and $m+r \leq 2$, M is selected from Mn and/or Al, Me is selected from any one or a combination of Zr, Zn, Cu, Cr, Mg, Fe, V, Ti, Sr, Sb, Y, W, and Nb, and A is selected from any one or a combination of N, F, S, and Cl, and a powder compacted density of the positive active material is not less than 3.3 g/cm³, forming, on a surface of at least a portion of the primary particles at non-outermost positions of the secondary particles, an inner coating layer, wherein the inner coating layer comprises a coating element selected from any one or a combination of Ba, Zn, W, Y, and P, and the inner coating layer is 0.01% to 0.5% by weight of the positive active material, and forming, on a surface of the positive active material, an outer coating layer, wherein the outer coating layer is a composite form of a continuous first coating layer and a discontinuous second coating layer, wherein the continuous first coating layer comprises an oxide of a coating element selected from any one or a combination of W, Y, Si, B, P and Sn, and wherein the discontinuous second coating layer comprises an oxide of a coating element selected from any one or a combination of Zn, and Co, and the outer coating layer is 0.01% to 0.5% by weight of the positive active material.

13. The positive active material according to claim 1, wherein the average length of the primary particles is of 500 nm to 1000 nm, and the average radial cross-sectional width of the primary particles is of 350 nm to 400 nm.

* * * * *